US009033591B2

United States Patent
Hikosaka et al.

(10) Patent No.: US 9,033,591 B2
(45) Date of Patent: May 19, 2015

(54) OPTICAL CONNECTOR AND METHOD OF ASSEMBLING THE OPTICAL CONNECTOR

(71) Applicant: Yazaki Corporation, Tokyo (JP)

(72) Inventors: Tomohiro Hikosaka, Susono (JP); Takamichi Kudo, Susono (JP)

(73) Assignee: Yazaki Corporation, Tokyo (JP)

( * ) Notice: Subject to any disclaimer, the term of this patent is extended or adjusted under 35 U.S.C. 154(b) by 138 days.

(21) Appl. No.: 13/958,734

(22) Filed: Aug. 5, 2013

(65) Prior Publication Data

US 2014/0044397 A1    Feb. 13, 2014

(30) Foreign Application Priority Data

Aug. 10, 2012  (JP) ................................. 2012-178654
Dec. 19, 2012  (JP) ................................. 2012-277095

(51) Int. Cl.
*G02B 6/36* (2006.01)
*G02B 6/38* (2006.01)

(52) U.S. Cl.
CPC ............. *G02B 6/38* (2013.01); *Y10T 29/49908* (2013.01); *G02B 6/3861* (2013.01); *G02B 6/3869* (2013.01); *G02B 6/3887* (2013.01); *G02B 6/3878* (2013.01)

(58) Field of Classification Search
CPC .......... G02B 6/36; G02B 6/38; G02B 6/3857; G02B 6/3861; G02B 6/3869; G02B 6/3878; G02B 6/3879; G02B 6/3887; G02B 6/381
See application file for complete search history.

(56) References Cited

U.S. PATENT DOCUMENTS

| | | | |
|---|---|---|---|
| 5,074,021 A | 12/1991 | Feng et al. | |
| 6,007,256 A | 12/1999 | Asada et al. | |
| 6,511,230 B1 * | 1/2003 | Connelly et al. | ................ 385/58 |
| 6,758,601 B2 * | 7/2004 | Holmquist | ....................... 385/75 |
| 7,621,676 B2 * | 11/2009 | Nakagawa et al. | ............. 385/81 |
| 7,712,970 B1 * | 5/2010 | Lee | ................... 385/58 |
| 7,850,370 B2 * | 12/2010 | Murano | ......................... 385/60 |
| 8,410,909 B2 * | 4/2013 | de Jong | ........................ 340/10.4 |
| 8,419,290 B2 * | 4/2013 | Wu | ................................ 385/53 |

(Continued)

FOREIGN PATENT DOCUMENTS

GB  2352832 B  12/1999
JP  2011-27876 A  2/2011

(Continued)

OTHER PUBLICATIONS

Office Action dated Nov. 18, 2014 issued by the State Intellectual Property Office of the People's Republic of China in counterpart Chinese Patent Application No. 201310349603.8.

*Primary Examiner* — Rhonda Peace
(74) *Attorney, Agent, or Firm* — Sughrue Mion, PLLC

(57) ABSTRACT

An optical connector includes a ferrule connected to an optical fiber cable, a housing for containing the ferrule, a ferrule holding member attached in the housing, and a spring member that urges the ferrule toward the housing. The ferrule holding member includes a support portion which restricts movement of the ferrule toward the tip side of the housing, a fiber insertion groove formed on the ferrule holding member for containing the optical fiber, a crimped portion which is provided on a rear portion of the ferrule holding member. A crimping member is attached to the crimped portion for fixing at least one of a high-tensile-strength wire and an outer sheath of the optical fiber cable. The spring member is attached to the ferrule holding member.

4 Claims, 14 Drawing Sheets

(56) References Cited

U.S. PATENT DOCUMENTS

| | | | |
|---|---|---|---|
| 8,662,760 B2 * | 3/2014 | Cline et al. | 385/76 |
| 8,845,209 B2 * | 9/2014 | Hikosaka et al. | 385/81 |
| 2009/0245734 A1 * | 10/2009 | Nakagawa et al. | 385/78 |
| 2013/0101258 A1 * | 4/2013 | Hikosaka et al. | 385/78 |
| 2013/0170798 A1 | 7/2013 | Enomoto et al. | |
| 2014/0037252 A1 * | 2/2014 | Hikosaka et al. | 385/81 |
| 2014/0044397 A1 * | 2/2014 | Hikosaka et al. | 385/81 |

FOREIGN PATENT DOCUMENTS

| | | | |
|---|---|---|---|
| JP | 2011203682 A | * | 10/2011 |
| JP | 2012008253 A | * | 1/2012 |
| WO | 2012053563 A1 | | 4/2012 |

* cited by examiner

OPTICAL CONNECTOR AND METHOD OF ASSEMBLING THE OPTICAL CONNECTOR

BACKGROUND

The present invention relates to an optical connector and a method of assembling the optical connector.

Parallel-multi-plug optical connectors in which plural optical connector plugs are connected together in parallel so as to be usable as a multi-core connector plug are known (refer to JP-A-2011-27876, for example).

In a parallel-multi-plug optical connector shown in FIG. 14, plural ferrules 505 to be connected to two or more optical cables that lead from a stop ring (not shown; located behind a rear case unit 503) can be contained in parallel in a single case 501 via respective springs 507. The case 501 includes a front case unit 511 having plural front insertion holes 509 in which front end portions of ferrules 505 are inserted, respectively, and the rear case unit 503 having plural rear insertion holes 513 in which rear end portions of the ferrules 505 are inserted together with the springs 507, respectively. The front case unit 511 and the rear case unit 503 are formed so as to be able to be combined with and fixed to each other.

The case 501 is assembled so that a ferrule 505, a ferrule holder 515, a tube 517, and a spring 507 are placed in each hole that is a connection of a front insertion hole 509 of the front case unit 511 and a rear insertion hole 513 of the rear case unit 503.

This parallel-multi-plug optical connector can serve as a multi-core connector plug though it is simple in structure.

However, the parallel-multi-plug optical connector in which the plural ferrules 505 to be connected to optical cables are contained, together with the springs 507, in the case 501 which is composed of the front case unit 511 and the rear case unit 503 has a problem that because of presence of a large number of advance insertion components such as the springs 507 and rear case unit 503 the termination workability is low. Furthermore, before being contained in the front insertion holes 509 and the rear insertion holes 513, the ferrules 505 which are not supported and are merely in contact with tip portions of the springs 507, respectively. Therefore, the ferrules 505 tend to shake and hence it is difficult to insert the two fibers (cores) into the respective front insertion holes 509 of the front case unit 511 simultaneously. This raises another problem of low assembling efficiency.

SUMMARY

The present invention has been made in the above circumstances, and an object of the present invention is therefore to provide an optical connector and a method of assembling the optical connector which enable cost reduction through increase in workability and assembling efficiency.

The above object of the invention can be attained by the following:

(1) There is provided an n optical connector comprising:
a ferrule that is connected to a tip portion of an optical fiber cable;
a housing that contains the ferrule;
a ferrule holding member that is attached in the housing and positions and holds the ferrule and an optical fiber in the housing; and
a spring member that urges the ferrule toward a tip side of the housing,
wherein the ferrule holding member includes:
a support portion which is provided at a tip portion of the ferrule holding member and restricts movement of the ferrule toward the tip side of the housing;
a fiber insertion groove which is formed on a side surface of the ferrule holding member for containing the optical fiber;
a crimped portion which is provided on a rear portion of the ferrule holding member from which the optical fiber leads out, and wherein a crimping member is attached to an outer circumferential surface of the crimped portion for fixing at least one of a high-tensile-strength wire and an outer sheath of the optical fiber cable; and
a spring fixing portion to which the spring member is fixed, the spring member being attached to the ferrule holding member so as to keep the ferrule in elastic contact with the support portion and to cover the fiber insertion groove.

By the above configuration, in fiber termination work, it is not necessary to insert the optical fiber into the spring member or the ferrule holding member in advance, whereby the termination workability is increased. Since the spring member is fixed to the ferrule holding member so as to cover the fiber insertion groove in which the optical fiber is contained, the optical fiber can be prevented from coming off when it is inserted into the housing. Furthermore, since the ferrule holding member holds the ferrule in a state that a portion of the ferrule is sandwiched between the support portion and the spring member and is kept in elastic contact with the support portion by the spring member, the insertion-into-housing work is facilitated.

(2) For example, the support portion has a U-shaped support portion which extends along an outer circumferential surface of the ferrule and a link support portion which links the U-shaped support portion to the tip portion of the ferrule holing member; and an annular portion is protrudingly formed on the outer circumferential surface of the ferrule and is retained by the U-shaped support portion so that movement of the ferrule toward the tip side of the housing is restricted.

By the above configuration, since the U-shaped support portion holds the ferrule in such a manner as to extend along its outer circumferential surface of the ferrule and the annular portion of the ferrule is locked on the U-shaped support portion, movement of the ferrule toward the tip side of the housing is restricted. As a result, work of fixing the ferrule to the support portion is facilitated.

(3) For example, the optical connector further comprises a protective member that has a protective portion and a flange portion, wherein the protective portion covers an outer circumferential surface of the optical fiber cable and the crimping member; wherein the flange portion is continuous with the protective portion and closes a rear opening of the housing; and wherein a T-shape projection projects from the flange portion toward the housing, a neck portion of the T-shape projection is inserted in a cut out portion formed on an outer side portion of the ferrule holding member, and an open end of the cut out portion is closed by an inner surface of a side wall of the housing.

By the above configuration, when the ferrule holding member in which the neck portion of the T-shaped projection is inserted in the cut out portion is contained in the housing, the open end of the cut out portion is closed by the side wall inner surface of the housing. As a result, the protective member is locked on the ferrule holding member through the T-shaped projection and does not come off the housing.

(4) There is provided a method of assembling an optical connector, comprising:

inserting a tip portion of an optical fiber cable into a crimping member;

fixing a ferrule to an exposed tip portion, exposed by removing an outer sheath from the tip portion of the optical fiber cable, of an optical fiber;

placing the ferrule on a support portion of a ferrule holding member while inserting the tip portion of the optical fiber into a fiber insertion groove which is formed in the ferrule holding member;

urging the ferrule forward in an axial direction of the ferrule by a spring member which is attached to the ferrule holding member so as to cover the fiber insertion groove;

fixing at least one of a high-tensile-strength wire and the outer sheath of the tip portion of the optical fiber cable to a crimped portion provided on a rear end portion of the ferrule holding member from which the optical fiber leads out by using the crimping member; and inserting the ferrule holding member which holds the ferrule into a housing and attaching the ferrule holding member to the housing.

In the method of assembling an optical connector according to the above, the optical fiber is inserted in advance into only the crimping member. The optical fiber to whose exposed tip portion the ferrule is fixed is inserted into the fiber insertion groove of the ferrule holding member and disposed therein. Since the spring member is attached to the ferrule holding member, the fiber insertion groove is thereby closed and the optical fiber which is held in the closed fiber insertion groove does not come off the ferrule holding member. Furthermore, the ferrule is held reliably because its portion is sandwiched between the support portion and the spring member while being urged by the spring member in the axial direction. As a result, even in the case where the optical fiber cable has plural optical fibers, ferrules which are fixed to the respective optical fibers are incorporated into the ferrule holding member while being held by the support portion and urged by the spring member. That is, simultaneous insertion, into the housing, of the plural ferrules being urged by the spring member is facilitated.

The optical connector and the manufacturing method of an optical connector according to the invention enable cost reduction through increase in workability and assembling efficiency.

The invention has been described above briefly. The details of the invention will become more apparent when the following modes for carrying out the invention (hereinafter referred to as embodiments) are read with reference to the accompanying drawings.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF EXEMPLARY EMBODIMENTS

Embodiments of the present invention will be hereinafter described with reference to the drawings.

Figure 1:
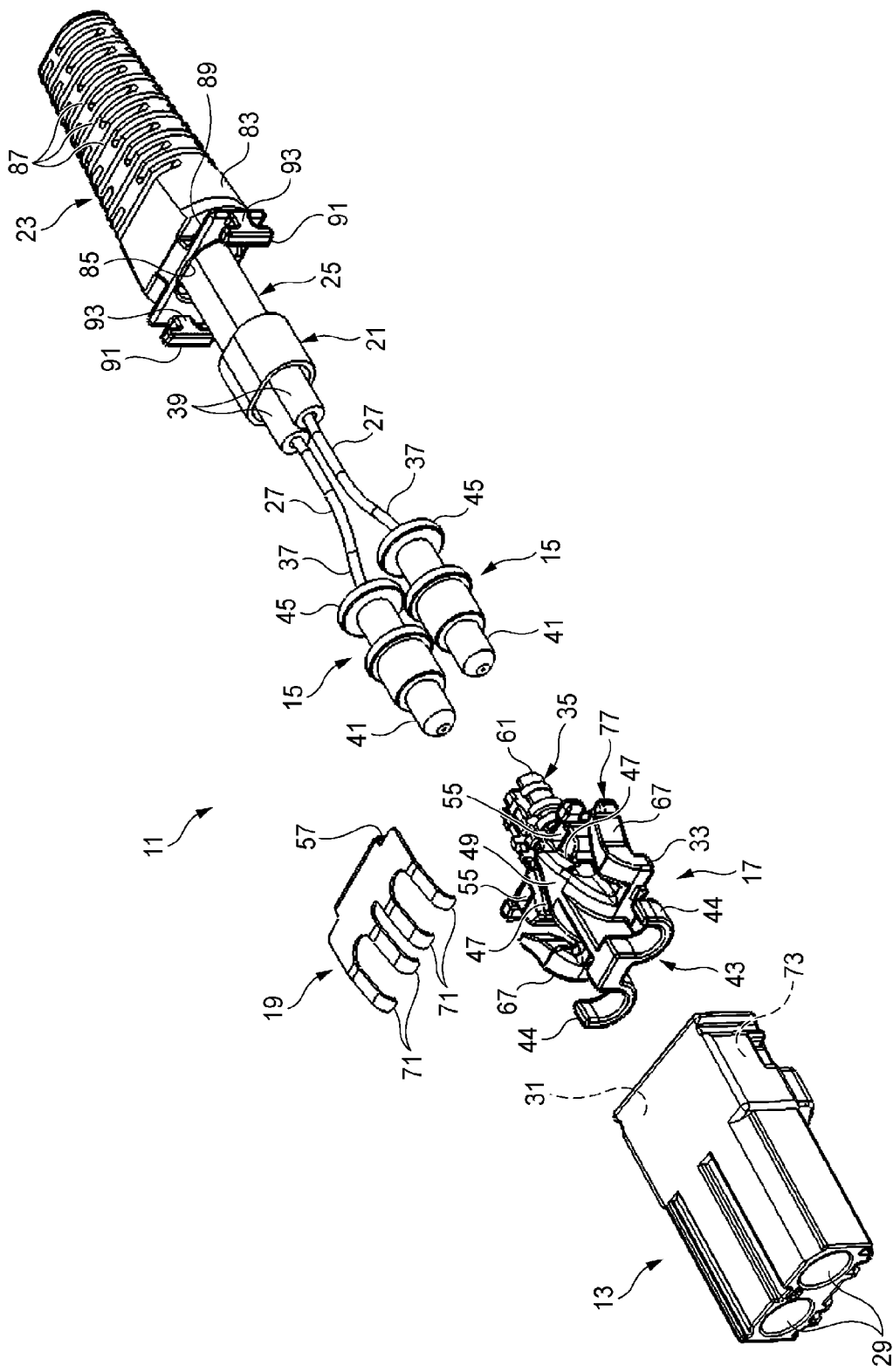
FIG. 1 is an exploded perspective view of an optical connector according to a first embodiment of the present invention.

As shown in FIG. 1, an optical connector 11 according to a first embodiment of the invention includes, as major constituent members, a housing 13, ferrules 15, a ferrule holding member 17, a spring member 19, a crimping ring (crimping member) 21, and a protective member 23. When coupled to a mating optical connector (not shown), the optical connector 11 establishes a connection state that the tips of optical fibers 27 of an optical fiber cable 25 abut on those of mating optical fibers, respectively. In this manner, optical fibers are interconnected to each other in automobiles etc.

The housing 13 which is made of a synthetic resin has, on the front side, a pair of coupling openings 29 for coupling to a mating optical connector (not shown). The housing 13 is formed with a rear opening 31 on the rear side. The housing 13 houses, at a deep position, the pair of ferrules 15 which have been inserted through the rear opening 31 and are held by the ferrule holding member 17. In this specification, in the optical connector 11, the side of the coupling openings 29 will be referred to as the front side and the side of the rear opening 31 will be referred to as the rear side.

Figure 10:
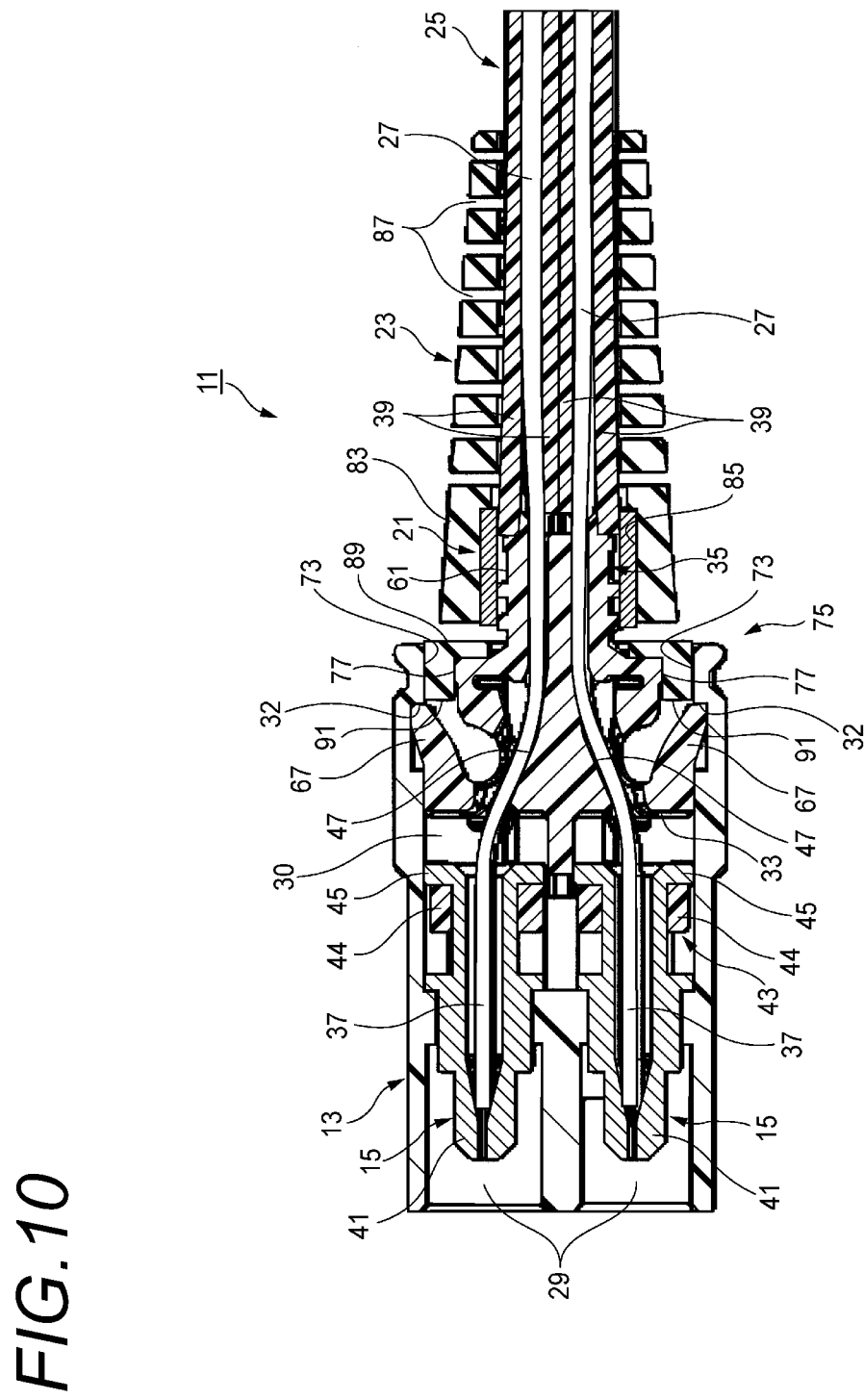
FIG. 10 is a horizontal sectional view of the optical connector shown in FIG. 9.

A holding member housing space 30 is formed inside the housing 13 and opens as the rear opening 31 at the rear end of the housing 13 (see FIG. 10). A main body 33 of the ferrule holding member 17 is placed in the holding member housing space 30. The ferrule holding member 17 whose main body 33 is placed in the holding member housing space 30 is attached to the housing 13 in a state that a crimped portion 35 projects from the rear opening 31.

The ferrules 15 are connected to tip portions 37 of the optical fibers 27 of the optical fiber cable 25, respectively. That is, the optical fiber tip portions 37 that are exposed by removing outer sheaths 39 and high-tensile-strength wires partially from the optical fiber cable 25 are inserted in and fixed to the ferrules 15, respectively. More specifically, bare fiber cores exposed by further removing inner coverings partially from the optical fibers 27 are inserted in and fixed to the ferrules 15, respectively, with adhesive or the like and the tips of the fiber cores are disposed in the tip surfaces of ferrule narrowest portions 41, respectively.

Annular portions 45 which are locked on a support portion 43 of the ferrule holding member 17 (described later) and thereby restrict forward movement of the ferrules 15 project from the outer circumferential surfaces of the ferrules 15, respectively. The ferrules 15 are contained in the housing 13 via the ferrule holding member 17 so as to be movable in the axial direction, and are urged elastically toward the front side of the housing 13 by the spring member 19 which is attached to the ferrule holding member 17.

The ferrules 15 are coupled to the respective ferrules of a mating optical connector in such a manner that the coupling end faces of the ferrule narrowest portions 41 abut on those of the mating ferrules, respectively. In this manner, the optical fibers 27 which are terminated by the ferrules 15 so as to enable connector connection are connected to the optical paths of the mating optical connectors.

The ferrules 15 which are urged forward elastically by the spring member 19 whose tips are engaged with the rear surfaces of the annular portions 45 are prevented from a further forward movement after the front surfaces of the annular portions 45 touch the support portion 43 of the ferrule holding member 17. In abutting on the ferrules of a mating optical connector, the ferrules 15 can be pushed somewhat rearward in the connecting direction within the elastic deformation range of the spring member 19. This presents occurrence of damage or the like due to extreme stress concentration. The urging force of the spring member 19 serves to cause the ferrules to abut on each other, whereby a target connection loss is obtained stably.

Figure 2:
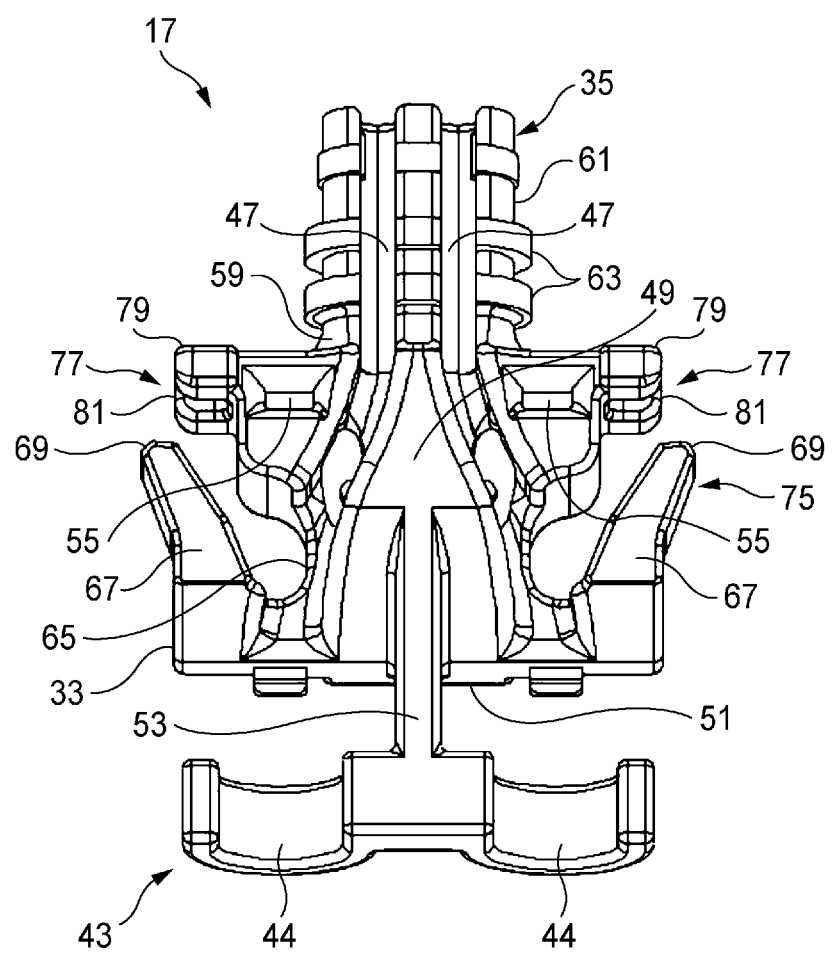
FIG. 2 is a plan view of a ferrule holding member shown in FIG. 1.

The ferrule holding member 17 is made of a hard resin material and, as shown in FIG. 2, has the main body 33 of the ferrule holding member 17 which is formed with a pair of fiber insertion grooves 47 in which the respective optical fibers 27 are placed. The fiber insertion grooves 47 are formed in a side surface 49 of the ferrule holding member 17 so as to be away from each other as the position goes forward. The crimped portion 35 projects rearward from the rear end of the main body 33 of the ferrule holding member 17. The fiber insertion grooves 47 extend so as to be also formed inside the crimped portion 35. The ferrule holding member 17 is contained in the housing 13 with the optical fibers 27 inserted in the respective fiber insertion grooves 47, and its crimped portion 35 leads out through the rear opening 31 of the housing 13.

Placed in the housing 13, the ferrule holding member 17 positions and holds the ferrules 15 and the optical fibers 27 in the housing 13. A tip portion 51 of the ferrule holding member 17 is provided with the support portion 43. The support portion 43 on which the annular portion 45 is locked restricts forward movement of the ferrules 15. The support portion 43 has a pair of U-shaped support portions 44 which extend alongside parts of the outer circumferential surfaces of the ferrules 15, respectively, and an extension wall (link support portion) 53 which links the pair of U-shaped support portions 44 to the tip portion 51 of the ferrule holding member 17. Each U-shaped support portion 44 has a semi-cylindrical shape so as to be able to support, from below, the associated ferrule 15 placed thereon.

The side surface 49 of the main body 33 of the ferrule holding member 17 is formed with a pair of spring fixing portions 55 with the fiber insertion grooves 47 interposed between them. The spring fixing portions 55 are fitted with respective engagement pieces 57 (see FIG. 6) of the spring member 19 (described later).

A rear end portion 59 of the ferrule holding member 17 is provided with the crimped portion 35 from which the optical fibers 27 lead out. At least one of the high-tensile-strength wires and the outer sheaths 39 of the optical fiber cable 25 are attached to the outer circumferential surface 61 of the crimped portion 35 by means of the crimping ring 21. The outer circumferential surface 61 of the crimped portion 35 is formed with plural annular projections 63 which are arranged in the axial direction and serve to increase the strength of crimping-induced force acting on the outer sheaths 39 etc. The fiber insertion grooves 47 are formed by cutting the annular projections 63. As a result, the optical fibers 27 can be inserted into the respective fiber insertion grooves 47 in the direction that is perpendicular to the fiber axial lines. That is, it is not necessary to insert the optical fibers 27 into the ferrule holding member 17 in advance unlike in the case of a closed cylindrical body.

Two outer side portions 65 of the main body 33 of the ferrule holding member 17 are provided with respective elastic lock pieces 67. Front end portions of the elastic lock pieces 67 are connected to the main body 33 of the ferrule holding member 17 and their rear end portions are free end portions which go away from each other gradually as the position goes rearward (see FIG. 2). Engagement nails 69 are formed at the tips of the free end portions, respectively. The elastic lock pieces 67 can be deformed elastically in the directions in which the engagement nails 69 come closer to and go away from the respective outer side portions 65. As described later, the engagement nails 69 are locked on respective engagement steps 32 which are formed in the inner surfaces of the housing 13 (see FIG. 10).

Figure 6:
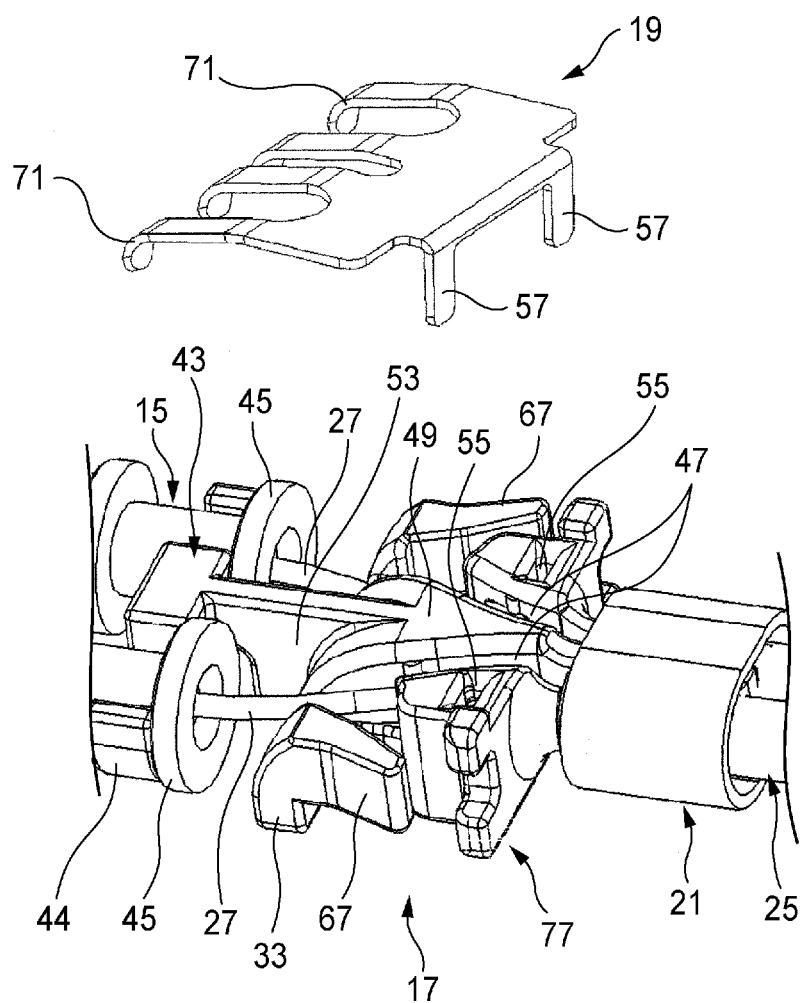
FIG. 6 is an enlarged perspective view of an essential part illustrating the spring member incorporation working step.

As shown in FIGS. 1 and 6, the spring member 19 is a thin plate-like member made of a high-springness metal or resin material. The spring member 19 has two pairs of parallel elastic arm pieces 71. Each optical fiber 27 is disposed between the associated pair of elastic arm pieces 71, and the tips of the elastic arm pieces 71 press the ferrules 15 forward. The spring member 19 is formed with a pair of engagement pieces 57 on the side opposite to the elastic arm pieces 71 so as to be bent downward by 90°. The pair of engagement pieces 57 are engaged with the respective spring fixing portions 55 of the main body 33 of the ferrule holding member 17. Since the engagement pieces 57 of the spring member 19 are engaged with the spring fixing portions 55, the spring member 19 is prevented from coming off the ferrule holding member 17 and is attached to the ferrule holding member 17 so as to cover the fiber insertion grooves 47 (see FIGS. 7 and 8).

In the first embodiment, the crimping ring 21 is shaped like an elliptical cylinder so that the two optical fibers 27 (two cores) can be inserted therein. It is preferable that the crimping ring 21 be made of a metal material that tends to be deformed plastically. The crimping ring 21 is put on the outer surfaces of outer sheaths 39 etc. that are placed on the outer circumferential surface 61 of the crimped portion 35, and fixes the outer sheaths 39 etc. to the crimped portion 35 when reduced in diameter through plastic deformation.

The holding member housing space 30 of the housing 13 include recesses (not shown) which are formed by cutting side walls of the holding member 13 from their inner surfaces 73 have bottom surfaces which are located outside the rear opening 31. Engagement steps 32 are formed at boundaries between the recesses and the side wall inner surfaces 73, and the engagement nails 69 of the elastic engagement pieces 67 are brought into contact with the respective engagement steps 32 from the front side and thereby engaged with the latter (see FIG. 10).

That is, the ferrule holding member 17 is inserted into the housing 13 through the rear opening 31 with its crimped portion 35 located on the rear side. When the ferrule holding member 17 is inserted through the rear opening 31, its elastic engagement pieces 67 are bent by the side wall inner surfaces 73 in such directions as to come closer to each other. The ferrule holding member 17 whose elastic engagement pieces 67 are bent is further inserted into the holding member housing space 30. And the engagement nails 69 of the elastic engagement pieces 67 reach the respective recesses, whereupon the elastic engagement pieces 67 are opened because of their elastic recovery and come to be engaged with the respective engagement steps 32. As a result, the ferrule holding member 17 is prevented from coming off the housing 13 rearward.

As for the optical fiber cable 25, whereas the optical fibers 27 lead out from the crimped portion 35 of the ferrule holding member 17, outer sheaths 39 are placed on the outer circumferential surface of the crimped portion 35. The outer sheaths 39 placed on the outer circumferential surface of the crimped portion 35 are fixed to the crimped portion 35 by crimping the elliptical-cylinder-shaped calking ring 21 which is located outside the outer sheaths 39. In this manner, the optical fiber cable 25 and the ferrule holding member 17 are fixed to each other and integrated together. If the optical fiber cable 25 is pulled rearward, the engagement nails 69 come into contact with the respective engagement steps 32, whereby the ferrule holding member 17 is prevented from coming off the housing 13. As such, the rear opening 31, the recesses, the engagement steps 32, the elastic engagement pieces 67, and the engagement nails 69 constitute an engagement mechanism 75 (see FIG. 10) which allows the ferrule holding member 17 to be inserted into the housing 13 through the rear opening 31 and prevents the ferrule holding member 17 from coming off the housing 13.

The outer side portions 65 of the ferrule holding member 17 are formed with respective cut out portions 77 at the rear end. Each cut out portion 77 is formed between a pair of cut forming pieces 79 which project outward perpendicularly from the rear end of the associated outer side portion 65 of the main body 33 of the ferrule holding member 17. Thus, each cut out portion 77 has an open end 81 which is the gap between the tips of the respective cut forming pieces 79. When the ferrule holding member 17 is inserted into the holding member housing space 30 of the housing 13, the open ends 81 are closed by the respective side wall inner surfaces 73 of the housing 13. That is, since the open ends 81 are closed by the side wall inner surfaces 73, the cut out portions 77 which have been open are changed to closed holes. The cut out portions 77 thus serve as portions to prevent coming-off of the protective member 23.

The protective member 23 is made of a soft material such as a synthetic rubber and, as shown in FIGS. 1 and 10, has a protective portion 83 with which the outer circumferential surfaces of the optical fiber cable 25 and the metal crimping ring 21 are covered. The protective portion 83 is formed, on the front side, with a crimped portion housing hole 85 which covers the outer circumferential surface of the crimping ring 21 which is crimped to fix the outer sheaths 39 of the optical fiber cable 25 to the crimped portion 35. The outer surface of the protective portion 83 is formed with plural circumferential grooves 87 which serve to give the protective portion 83 a proper degree of bendability. The protective member 23 has a rectangular flange portion 89 which is continuous with the protective portion 83 and serves to cover the rear opening 31 of the housing 13.

T-shaped projections 91 project forward (i.e., toward the deep side when inserted in the housing 13) from the two respective sides of the flange portion 89. Like the above-described pair of cut out portions 77, the pair of T-shaped projections 91 are provided on the left side and the right side. Each T-shaped projection 91 is composed of a neck portion 93 which projects perpendicularly from the flange portion 89 and a wide portion which is connected to the tip of the neck portion 93. In the first embodiment, each wide portion has a column shape which expends perpendicularly to the neck portion 93. Alternatively, for example, each wide portion may be shaped like a triangular plate whose base is connected to the neck portion 93 or a semicircular plate whose diameter is connected to the neck portion 93.

The T-shaped projections 91 are molded integrally with the flange portion 89 and are flexible. Being flexible, the T-shaped projections 91 can be opened so that their wide portions are displaced outward. Therefore, the neck portions 93 of the T-shaped projections 91 can be inserted into the cut out portions 77 through their open ends 81, respectively. The T-shaped projections 91 whose neck portions 93 are inserted in the cut out portions 77 are prevented from coming off rearward, respectively, because each of their wide portions is hooked on the cut forming pieces 79. In a state that the ferrule holding member 17 is not attached to the housing 13, the neck portions 93 of the T-shaped projections 91 can go out of the cut out portions 77 through the open ends 81, respectively. On the other hand, after the ferrule holding member 17 has been attached to the housing 13, the neck portions 93 cannot pass through the open ends 81 because the open ends 81 are closed by the side wall inner surfaces 73. As a result, the T-shaped projections 91 are reliably prevented from coming off the respective cut out portions 77, whereby the housing 13, the ferrule holding member 17, and the protective member 23 are assembled together integrally.

Next, an assembling method of the above-configured optical connector 11 will be described with reference to FIGS. 3-8.

Figure 3:
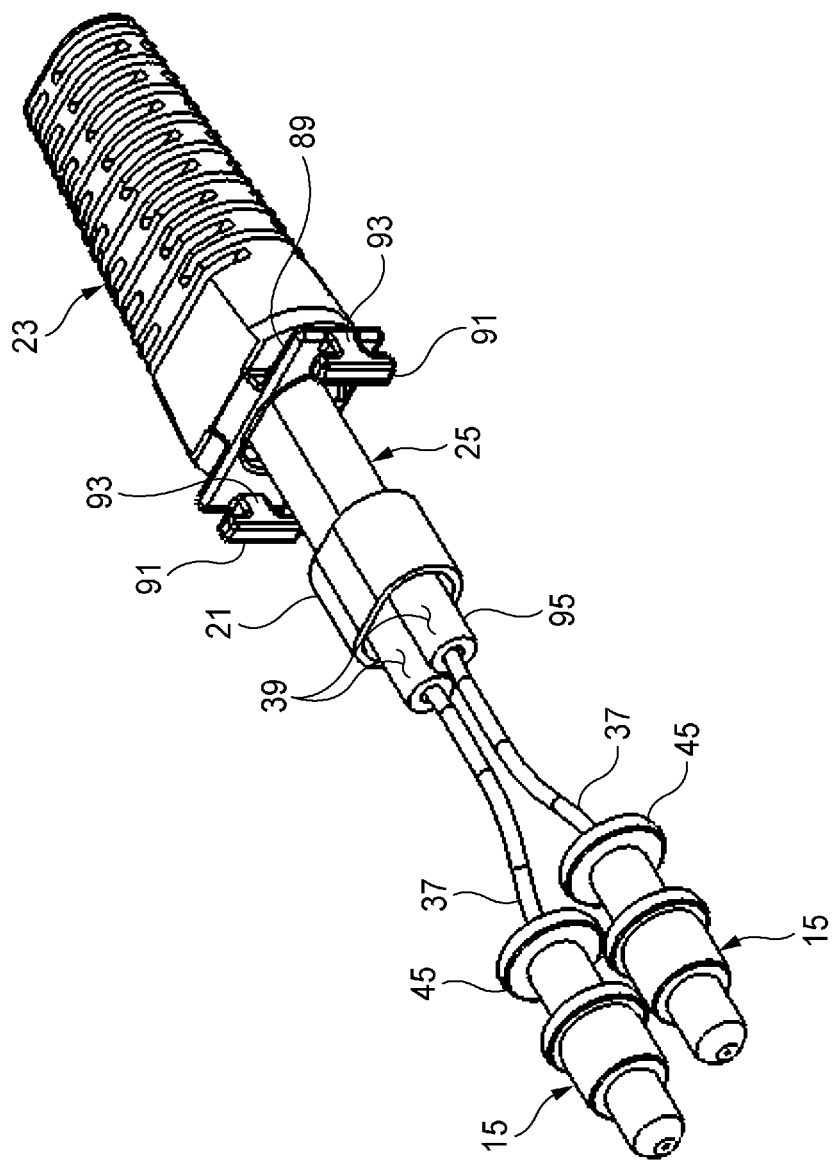
FIG. 3 is a perspective view illustrating a fiber termination working step for the optical connector shown in FIG. 1.

To assemble the optical connector 11, first, as shown in FIG. 3, a tip portion 95 of the optical fiber cable 25 is inserted into the protective member 23 and the crimping ring 21 in this order. Then, the ferrules 15 are fixed to tip portions 37, exposed by removing outer sheaths 39, of the optical fibers 27, respectively.

Figure 4:
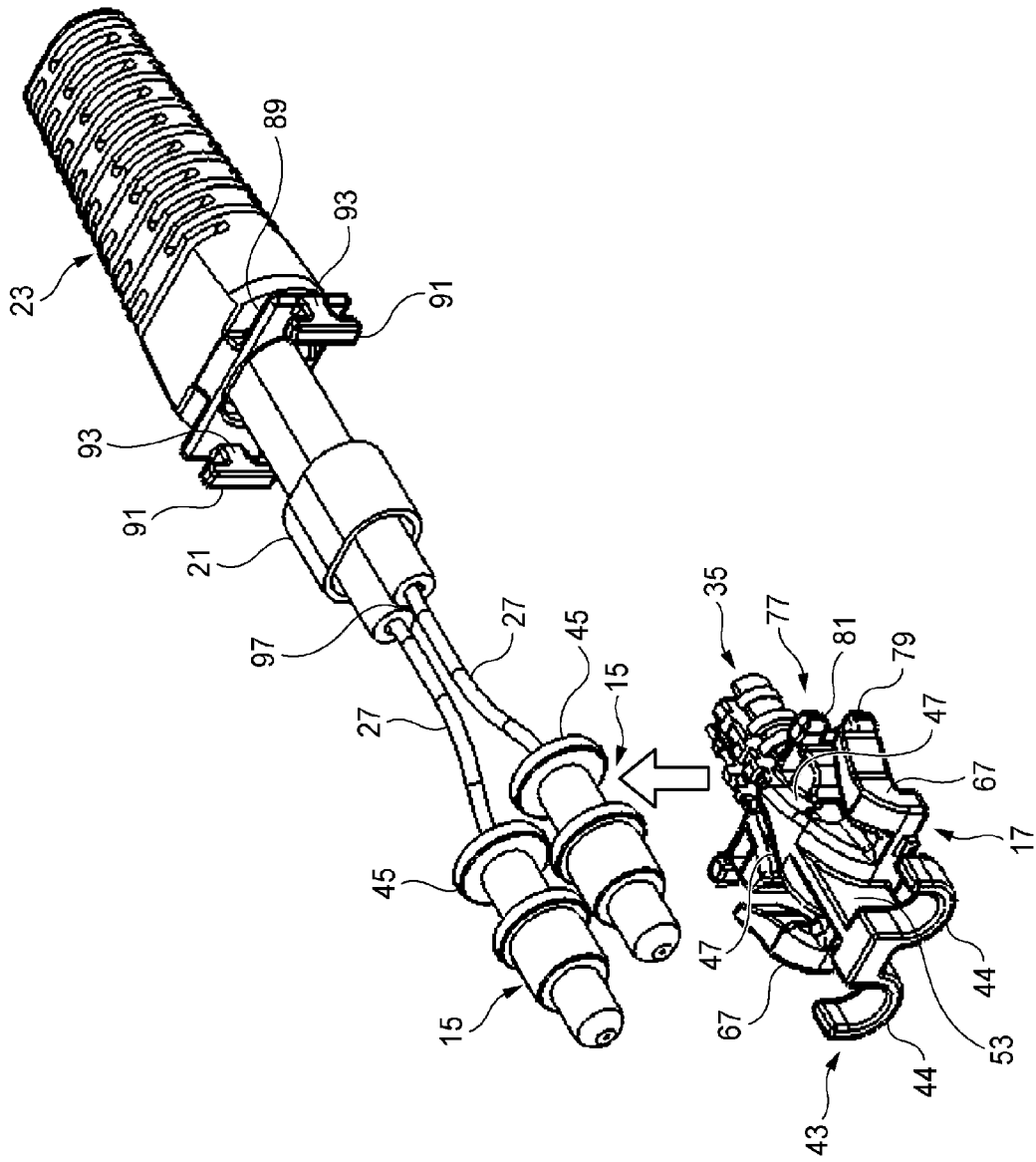
FIG. 4 is an exploded perspective view illustrating a ferrule holding working step using the ferrule holding member.
Figure 5:
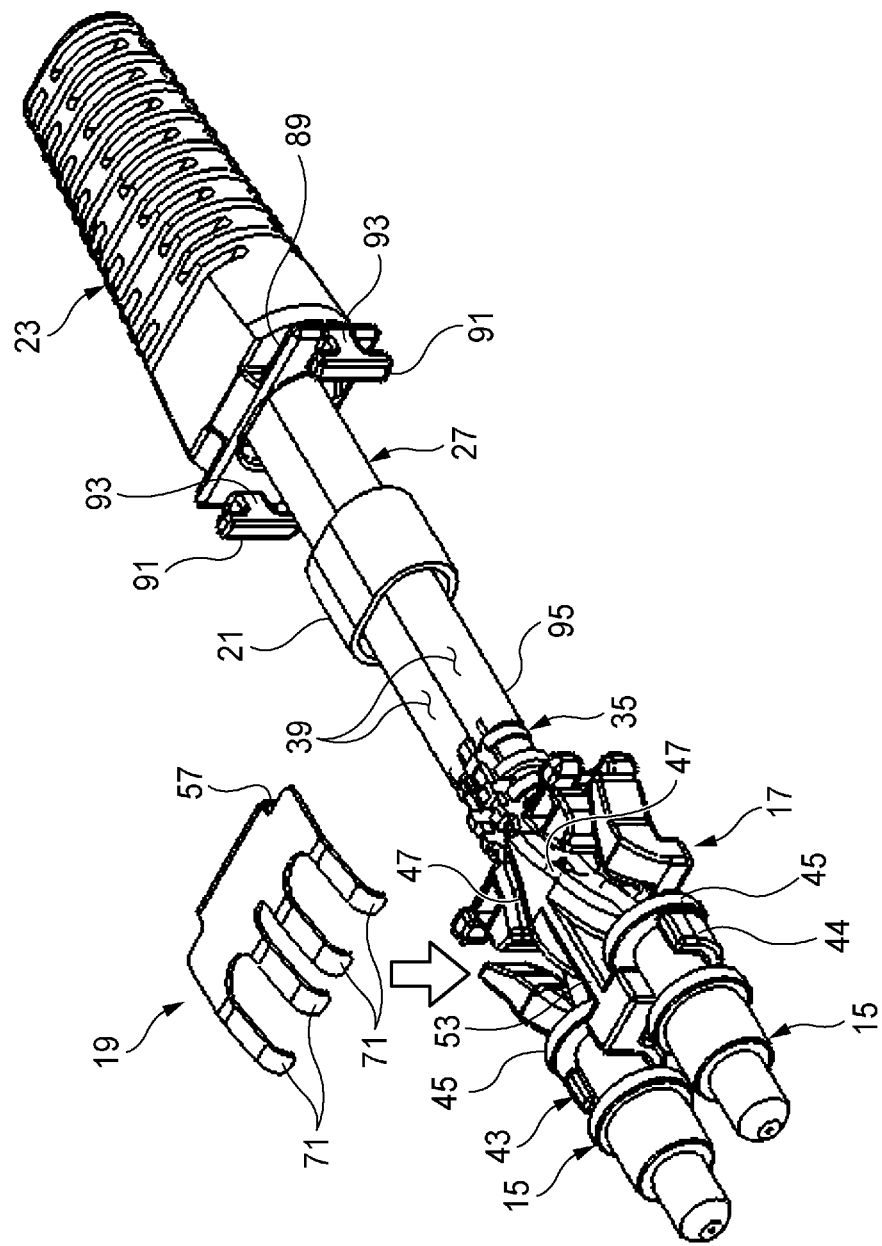
FIG. 5 is an exploded perspective view illustrating a spring member incorporation working step.

Then, as shown in FIG. 4, the ferrules 15 are placed on the support portion 43 of the ferrule holding member 17 while the optical fibers 27 are inserted into the respective fiber insertion grooves 47 which are recesses formed in the ferrule holding member 17. In this assembling step, the work of causing the ferrules 15 to be held by the support portion 43 is facilitated because the pair of U-shaped support portions 44 of the support portion 43 can hold parts of the outer circumferential surfaces of the ferrules 15, respectively, and restrict forward movement of the ferrules 15 because the annular portions 45 are locked on them.

Figure 7:
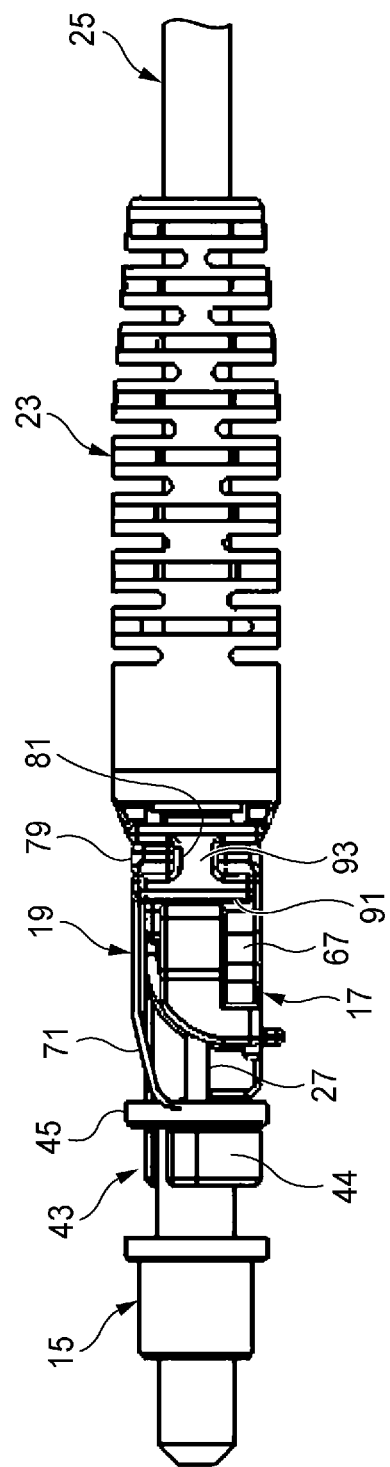
FIG. 7 is a side view showing a state that a spring member is incorporated in and a protective member is temporarily locked on the ferrule holding member.

Then, the tip portions of the spring member 19 which is attached to the ferrule holding member 17 so as to cover the fiber insertion grooves 47 (see FIGS. 5 and 6) are engaged with the rear surfaces of the annular portions 45, whereby the ferrules 15 are urged forward in the axial direction (see FIG. 7). After the crimped portion 35 (from which the optical fibers 27 lead out) of the rear end portion 59 is covered with the outer sheaths 39 of the tip portion 95 of the optical fiber cable 25, the crimping ring 21 is fixed to the outer circumferential surfaces of the outer sheaths 39 by crimping.

Figure 8:
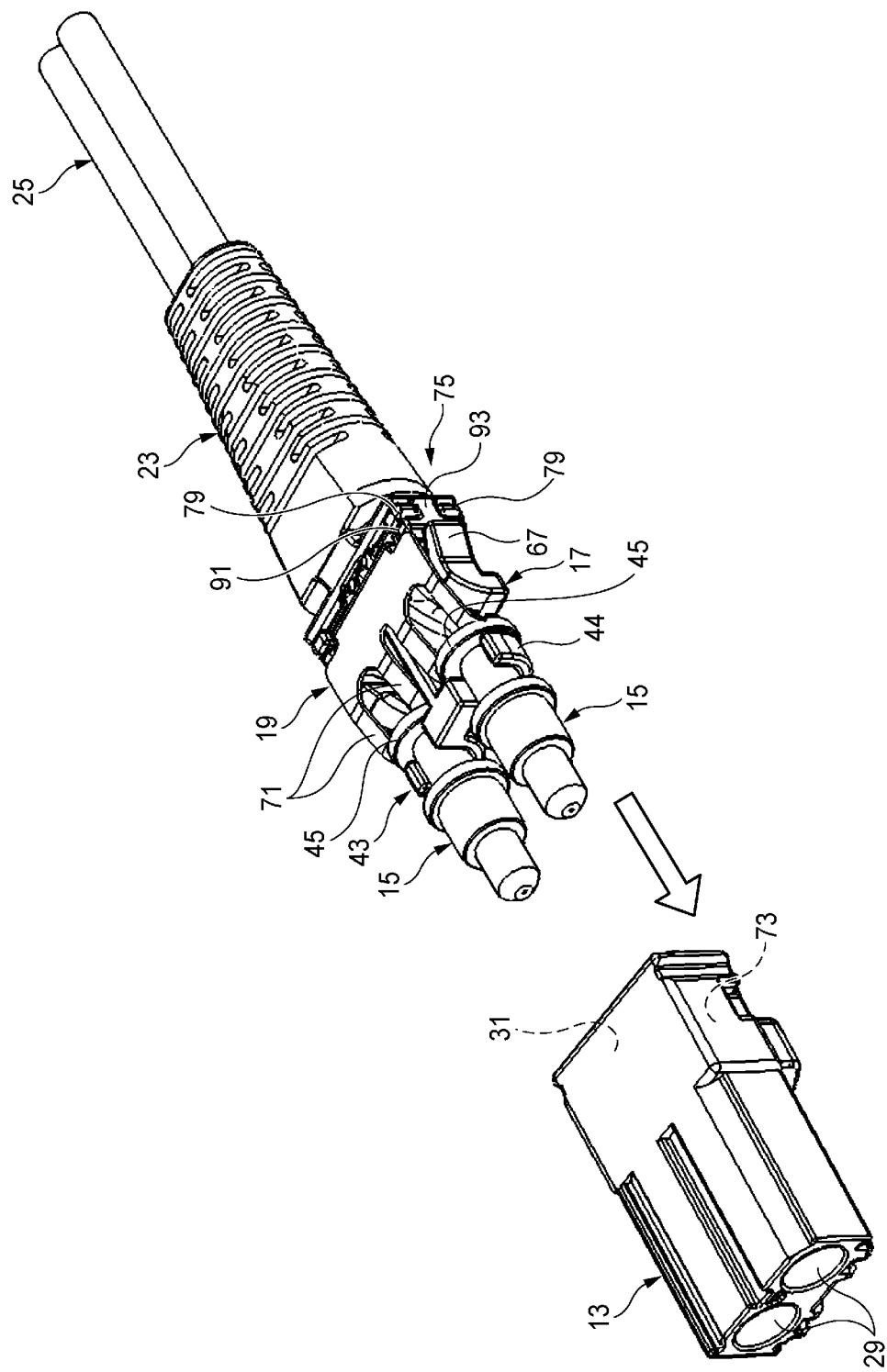
FIG. 8 is an exploded perspective view illustrating a working step of attaching the ferrule holding member which holds ferrules to a housing.

Then, as shown in FIG. 8, the ferrule holding member 17 which holds the ferrules 15 is inserted into the housing 13 through the rear opening 31 and attached to the housing 13 together with the protective member 23.

In the first embodiment, the two optical fibers 27 (two cores) are covered with the respective outer sheaths 39 which are a pair of parallel tube-shaped outer sheaths connected to each other. To cover the outer circumferential surfaces 61 (see FIG. 2) of the cylindrical crimped portion 35 with the outer sheaths 39, first, the outer sheaths 39 are separated from each other at a tube connecting portion 97 of the tube-shaped outer sheaths (see FIG. 4), that is, the tube-shaped outer sheaths are cut at the tube connecting portion 97 in the axial direction. As a result, each tube-shaped outer sheath can be opened into a semi-cylindrical shape. The left and right halves of the cylindrical crimped portion 35 are covered with the semi-cylindrical tube-shaped outer sheaths, respectively, and are fixed together by the crimping ring 21 from outside.

As for the protective member 23, the neck portions 93 of the T-shaped projections 91 are inserted into the respective cut out portions 77 of the ferrule holding member 17 from outside (i.e., in the directions that are perpendicular to the axes of the neck portions 93) while being bent. As a result, as shown in FIG. 8, the wide portion of each T-shaped projection 91 comes into contact with the pair of cut forming pieces 79 located above and below the cut out portion 77, whereby the protective member 23 is prevented from coming off in the lead-out direction of the optical fiber cable 25. In this assembling step, the neck portions 93 (see FIG. 7) of the T-shaped projections 91 can easily be inserted through the open ends 81 into the cut out portions 77 of the ferrule holding member 17 which has not been contained in the housing 13 by elastically deforming the neck portions 93, respectively.

Figure 9:
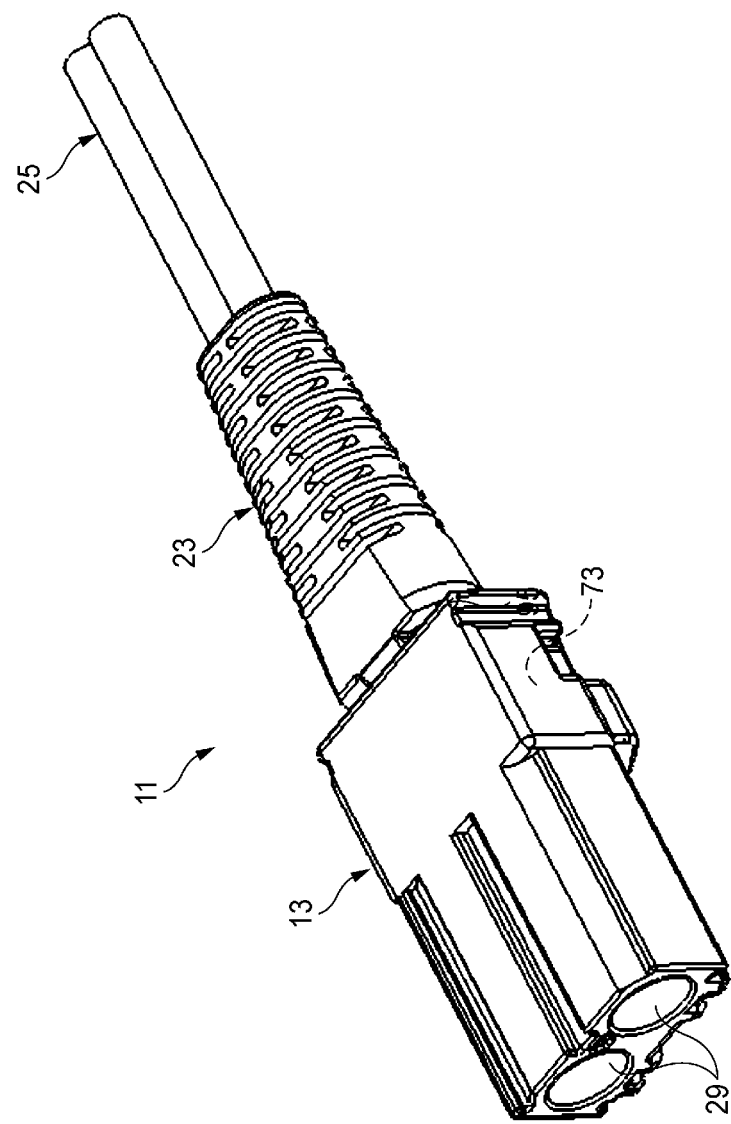
FIG. 9 is a perspective view of a final optical connector assembled.

On the other hand, in the main assembling in which the housing 13, the ferrule holding member 17, and the protective member 23 are assembled together, the ferrule holding member 17 in which the T-shaped projections 91 are inserted in the respective cut out portions 77 is inserted into the housing 13 through the rear opening 31 (see FIG. 8). As shown in FIGS. 9 and 10, when the cut out portions 77 in which the neck portions 93 of the T-shaped projections 91 are inserted are contained in the housing 13, the open ends 81 (see FIG. 7) are closed by the side wall inner surfaces 73 of the housing 13. As a result, the T-shaped projections 91 are reliably prevented from coming off the respective cut out portions 77.

In the first embodiment, the optical fibers 27 are inserted into the protective member 23 and the crimping ring 21 in this order starting from their tip portions 37 which are exposed by removing the outer sheaths 39. Then, the ferrules 15 are connected to the respective optical fibers 27. After the outer sheaths 39 are fixed to the crimped portion 35 by the crimping ring 21, the crimping ring 21 is covered with the protective portion 83 of the protective member 23. The T-shaped projections 91, projecting forward from the flange portion 89, of the protective member 23 with which the crimping ring 21 is covered are locked on the ferrule holding member 17. Finally, the ferrule holding member 17 on which the protective member 23 is locked is attached to the housing 13 through the rear opening 31. That is, the preliminary assembling in which the protective member 23 is attached to the ferrule holding member 17 and the main assembling in which the ferrule holding member 17 is attached to the housing 13 are facilitated because they are both performed in the same assembling direction (the axial direction of the optical fiber cable 25). Further, adaptation to automatic assembling can be made easier.

Next, a description will be made of advantages of the assembling method of the optical connector 11 according to the first embodiment.

In the above assembling method, the optical fibers 27 are inserted in advance into the two members, that is, the protective member 23 and the crimping ring 21. The optical fibers 27 to whose tip portions 37 the ferrules 15 are fixed are inserted into the respective fiber insertion grooves 47 of the ferrule holding member 17 and disposed therein. Since the spring member 19 is attached to the ferrule holding member 17 as shown in FIGS. 7 and 8, the fiber insertion grooves 47 are thereby closed and the optical fibers 27 which are held in the closed fiber insertion grooves 47 do not come off the ferrule holding member 17. Furthermore, the ferrules 15 are held reliably because the annular portions 45 are sandwiched between the support portion 43 and the spring member 19 while being urged by the spring member 19 in the axial direction. As a result, even in the case where the optical fiber cable 25 has plural optical fibers 27, the ferrules 15 which are fixed to the respective optical fibers 27 are incorporated into the ferrule holding member 17 while being held by the support portion 43 urged by the spring member 19. That is, simultaneous insertion, into the housing 13, of the plural ferrules 15 being urged by the spring member 19 is facilitated.

Next, a description will be made of advantages of the above-configured optical connector 11 according to the first embodiment.

In the optical connector 11 according to the first embodiment, in fiber termination work, it is not necessary to insert the optical fibers 27 into the spring member 19 or the ferrule holding member 17 in advance, whereby the termination workability is increased. Since the spring member 19 is fixed to the ferrule holding member 17 so as to cover the fiber insertion grooves 47 in which the optical fibers 27 are contained, the optical fibers 27 can be prevented from coming off when they are inserted into the housing 13. Furthermore, since the ferrule holding member 17 holds the ferrules 15 in a state that the annular portions 45 of the ferrules 15 are sandwiched between the support portion 43 and the spring member 19 and are kept in elastic contact with the respective U-shaped support portions 44 of the support portion 43 by the spring member 19, the insertion-into-housing work is facilitated.

When the ferrule holding member 17 in which the neck portions 93 of the T-shaped projections 91 are inserted in the respective cut out portions 77 is contained in the housing 13, the open ends 81 of the respective cut out portions 77 are closed by the side wall inner surfaces 73 of the housing 13. As a result, the protective member 23 is locked on the ferrule holding member 17 through the T-shaped projections 91 and does not come off the housing 13.

Furthermore, when the ferrule holding member 17 which holds the ferrules 15 is inserted into the housing 13 through the rear opening 31 together with the ferrules 15, the engagement mechanism 75 which consists of members and portions of the housing 13 and the ferrule holding member 17 prevents the ferrule holding member 17 from coming off rearward. The assembling of the optical connector 11 is thus facilitated. At this time, since as described above the open ends 81 are closed by the side wall inner surfaces 73, the neck portions 93 of the T-shaped projections 91 which are inserted in the respective cut out portions 77 of the ferrule holding member 17 are prevented from going out of the cut out portions 77. The attachment of the protective member 23 is completed at the same time. Thus, the assembling can be performed efficiently.

Next, an optical connector 111 according to a second embodiment will be described with reference to FIG. 11 to FIGS. 13A and 13B.

Figure 11:
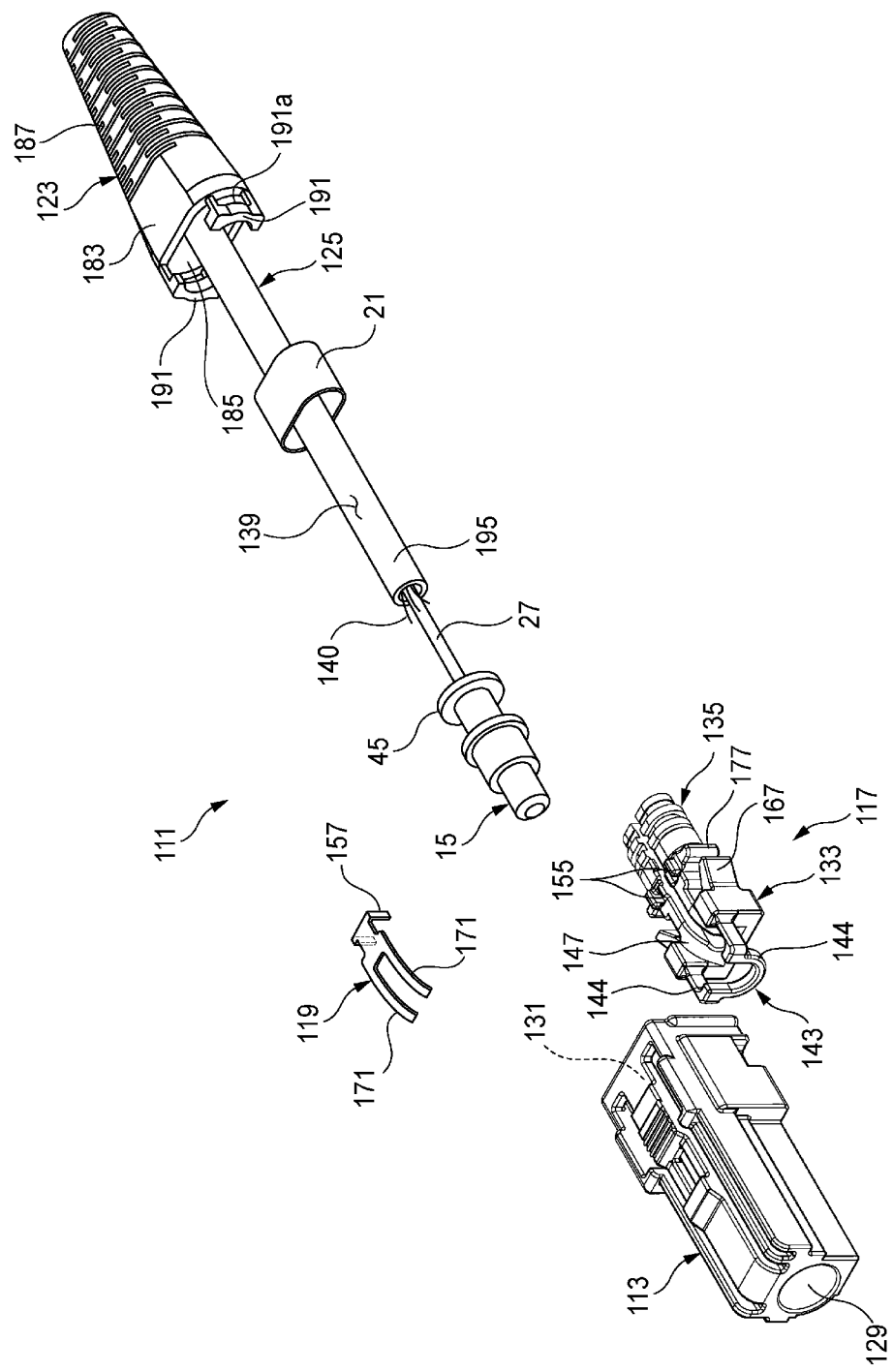
FIG. 11 is an exploded perspective view of an optical connector according to a second embodiment of the invention.

As shown in FIG. 11, like the optical connector 11 according to the first embodiment, the optical connector 111 according to the second embodiment includes, as major constituent members, a housing 113, a ferrule 15, a ferrule holding member 117, a spring member 119, a crimping ring 21, and a protective member 123.

However, whereas the optical connector 11 according to the first embodiment is an optical connector to be connected to tip portions 95 of an optical fiber cable 25 in which two optical fibers 27 (two cores) are covered with outer sheaths 39, the optical connector 111 according to the second embodiment is an optical connector to be connected to a tip portion 195 of an optical fiber cable 125 in which a single-core optical fiber 27 and high-tensile-strength wires 140 are covered with an outer sheath 139. Therefore, although the housing 113, the ferrule holding member 117, the spring member 119, and the protective member 123 are different in structure than in the optical connector 11 according to the first embodiment, the other part of the configuration of the optical connector 111 according to the second embodiment is the same as in the optical connector 11 according to the first embodiment.

The housing 113 which is made of a synthetic resin has, on the front side, a single coupling opening 129 for coupling to a mating optical connector (not shown). The housing 113 is formed with a rear opening 131 on the rear side. The single ferrule 15 which is held by the ferrule holding member 117 is inserted into the housing 113 through the rear opening 131 and contained in the housing 113 behind the coupling opening 129.

A holding member housing space is formed inside the housing 113, and a holding member main body 133 of the ferrule holding member 117 is contained in the holding member housing space. The ferrule holding member 117 whose holding member main body 133 is contained in the holding member housing space is attached to the housing 113 in a state that a crimped portion 135 projects from the rear opening 131.

Figure 12A:
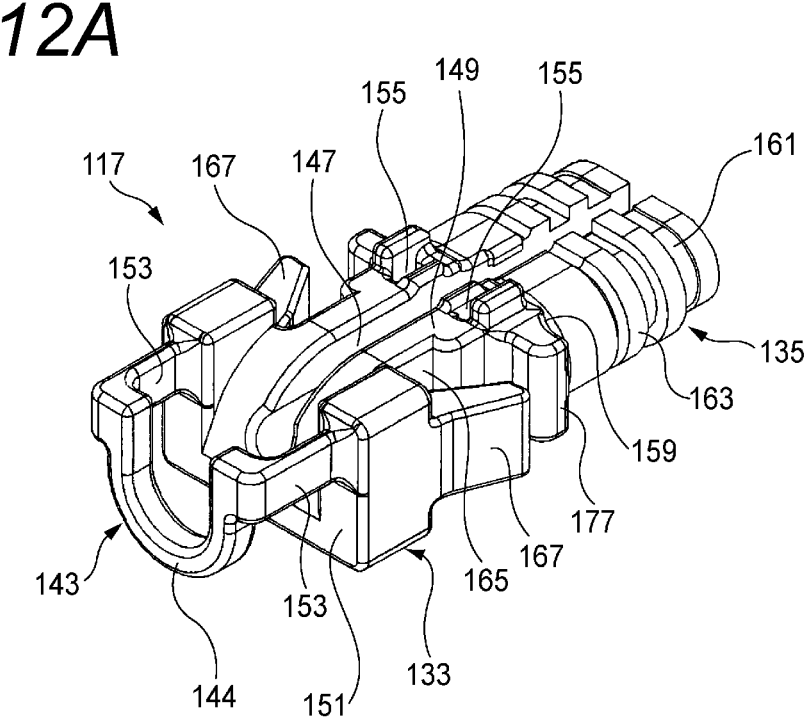
FIG. 12A is a perspective view of a ferrule holding member shown in FIG. 11.
Figure 12B:
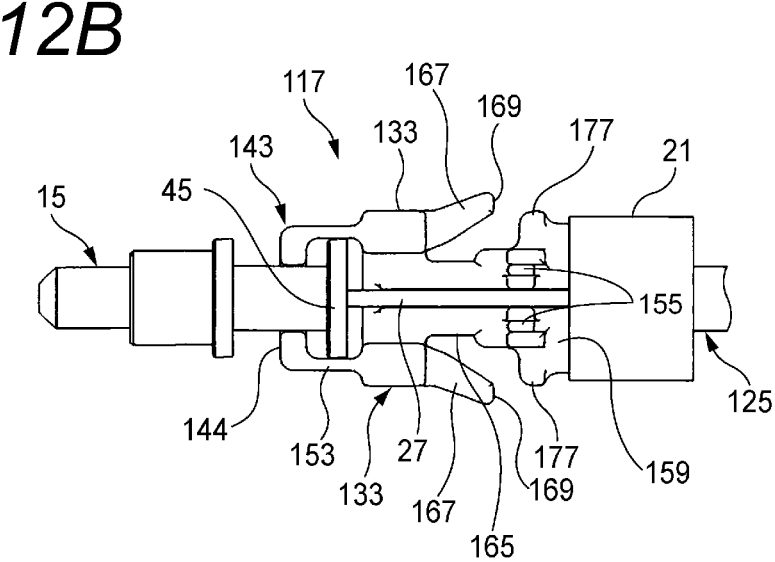
FIG. 12B is a plan view showing a state that the ferrule holding member shown in FIG. 12A holds a ferrule.

The ferrule holding member 117 is made of a hard resin material and, as shown in FIG. 12A, has the holding member main body 133 which is formed with a single fiber insertion groove 147 in which an optical fiber is placed. The fiber insertion groove 47 is formed in a side surface 149 of the ferrule holding member 17 so as to extend in the front-rear direction. The crimped portion 135 projects rearward from the rear end of the holding member main body 133. The fiber insertion groove 47 extends so as to be also formed inside the crimped portion 135. The ferrule holding member 117 is contained in the housing 13 with the optical fiber 27 inserted in the fiber insertion groove 47, and its crimped portion 135 leads out through the rear opening 131 of the housing 113.

Placed in the housing 113, the ferrule holding member 117 positions and holds the ferrule 15 and the optical fiber 27 in the housing 13. A tip portion 151 of the ferrule holding member 17 is provided with a support portion 143. The support portion 143 on which an annular portion 45 is locked restricts forward movement of the ferrule 15. The support portion 143 has a U-shaped support portion 44 which extends alongside part of the outer circumferential surface of the ferrule 15 and a pair of link support portions 153 which link the two ends of the U-shaped support portion 144 to the tip portion 151 of the ferrule holding member 17. The U-shaped support portion 44 has a semi-cylindrical shape so as to be able to support, from below, the ferrule 15 placed thereon.

The side surface 149 of the main body 133 is formed with a pair of spring fixing portions 155 with the fiber insertion groove 147 interposed between them. The spring fixing portions 55 are fitted with respective engagement pieces 157 (see FIG. 11) of the spring member 119 (described later).

A rear end portion 159 of the ferrule holding member 117 is provided with the crimped portion 135 from which the optical fiber 27 leads out. At least one of the high-tensile-strength wires and the outer sheath 139 of the optical fiber cable 125 is attached to the outer circumferential surface 161 of the crimped portion 135 by means of the crimping ring 21. The outer circumferential surface 161 of the crimped portion 135 is formed with plural annular projections 163 which are arranged in the axial direction and serve to increase the strength of crimping-induced force acting on the outer sheaths 139 etc. The fiber insertion groove 147 is formed by cutting the annular projections 163. As a result, the optical fiber 27 can be inserted into the fiber insertion groove 147 in the direction that is perpendicular to the fiber axial line. That is, it is not necessary to insert the optical fiber 27 into the ferrule holding member 117 in advance unlike in the case of a closed cylindrical body.

Two outer side portions 165 of the holding member main body 133 are provided with elastic lock pieces 167 and lock projections 177, respectively. Front end portions of the elastic lock pieces 167 are connected to the holding member main body 133 and their rear end portions are free end portions which go away from each other gradually as the position goes rearward (see FIG. 12B). Engagement nails 169 are formed at the tips of the free end portions, respectively. The elastic lock pieces 167 can be deformed elastically in the directions in which the engagement nails 169 come closer to and go away from the respective outer side portions 165. The engagement nails 169 are locked on respective engagement steps (not shown) which are formed in the inner surfaces of the housing 113. The lock projections 177 project outward perpendicularly from respective outside portions of the rear end of the holding member main body 133.

As shown in FIG. 11, the spring member 119 is a thin plate-like member made of a high-springness metal or resin material. The spring member 119 has a pair of parallel elastic arm pieces 171. The optical fiber 27 is disposed between the pair of elastic arm pieces 171, and the tips of the elastic arm pieces 171 press the annular portion 45 of the ferrule 15 forward. The spring member 119 is formed with a pair of engagement pieces 157 on the side opposite to the elastic arm pieces 171 so as to be bent downward by 90°. The pair of engagement pieces 157 are engaged with the respective spring fixing portions 155 of the holding member main body 133 (see FIG. 12B). Since the engagement pieces 157 of the spring member 119 are engaged with the spring fixing portions 155, the spring member 119 is prevented from coming off the ferrule holding member 117 and is attached to the ferrule holding member 117 so as to cover the fiber insertion groove 147 (see FIG. 13A).

Figure 13A:
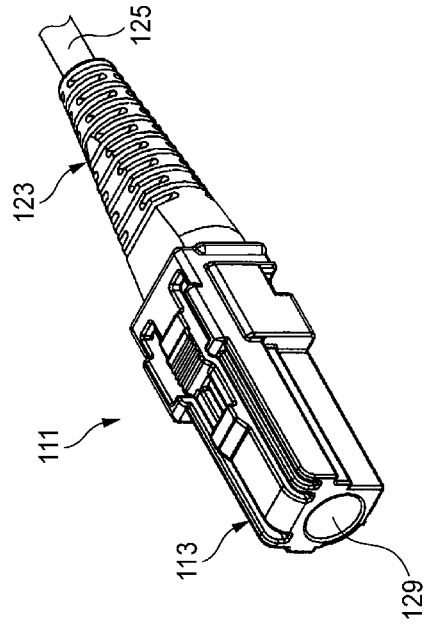
FIG. 13A is a perspective view showing a state that a spring member is incorporated in and a protective member is temporarily locked on the ferrule holding member shown in FIG. 12B.
Figure 13B:
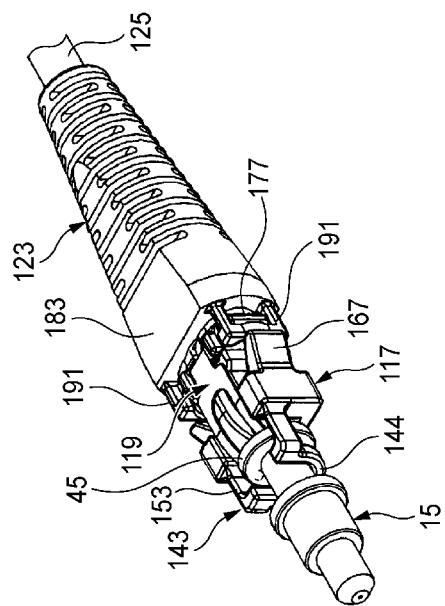
FIG. 13B is a perspective view of a final optical connector assembled in which the ferrule holding member shown in FIG. 13A is attached to a housing.
Figure 14:
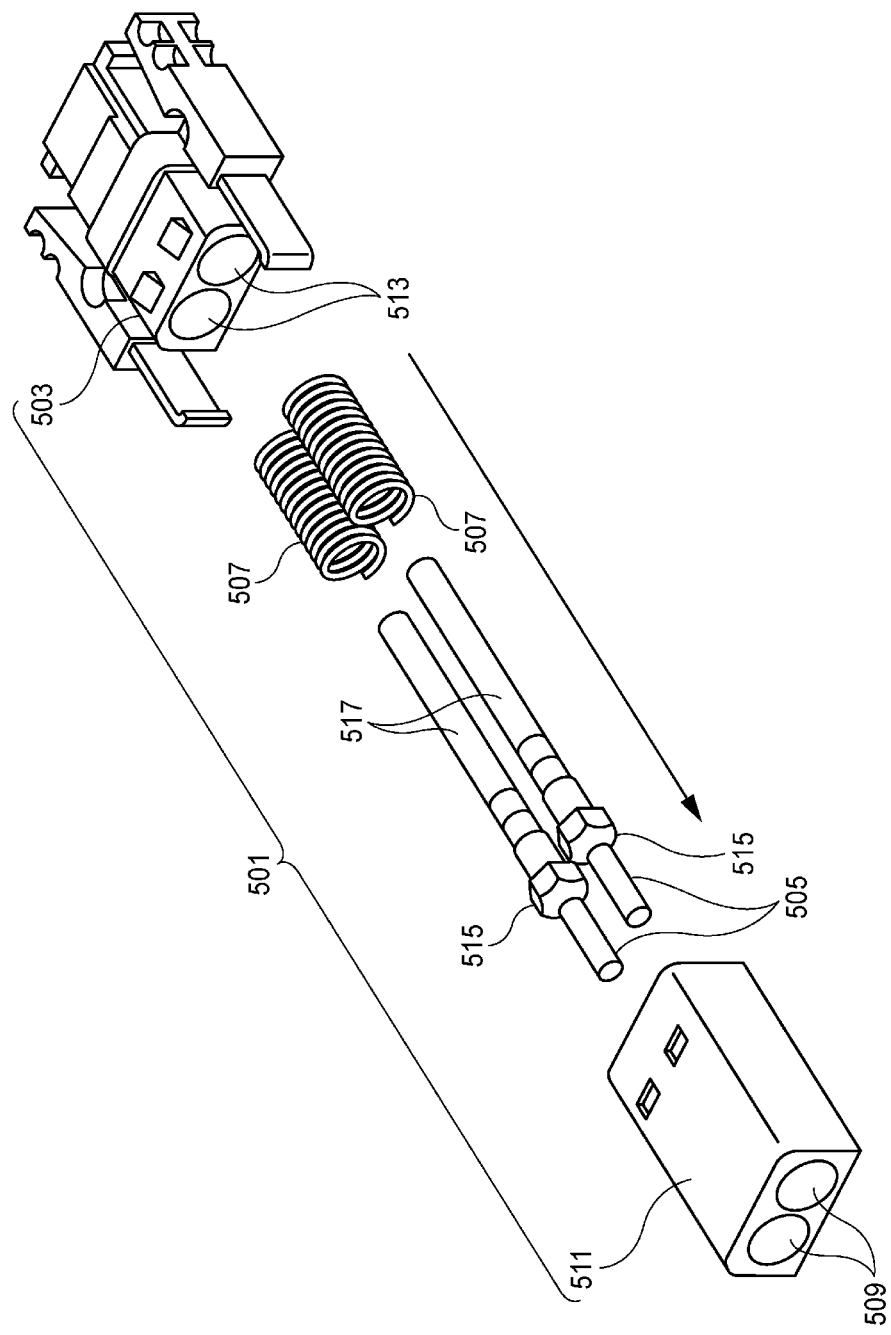
FIG. 14 is an exploded perspective view of an essential part of a conventional parallel-multi-plug optical connector.

The protective member 123 is made of a soft material such as a synthetic rubber and, as shown in FIG. 11 and FIGS. 13A and 13B, has a protective portion 183 with which the outer circumferential surfaces of the optical fiber cable 125 and the metal crimping ring 21 are covered. The protective portion 183 is formed, on the front side, with a crimped portion housing hole 185 which covers the outer circumferential surface of the crimping ring 21 which is crimped to fix the outer sheath 139 of the optical fiber cable 125 to the crimped portion 135. The outer surface of the protective portion 183 is formed with plural circumferential grooves 187 which serve to give the protective portion 183 a proper degree of bendability.

A pair of hook projections 191 project forward (i.e., toward the deep side when inserted in the housing 113) from the two respective sides of the front end of the protective portion 183. Being flexible, the hook projections 191 can be opened so that their tip portions are displaced outward. Therefore, when the lock projections 177 are inserted into openings 191a of the hook projections 191, respectively (see FIG. 13A), the protective member 123 is prevented from coming off the ferrule holding member 117.

Finally, as shown in FIG. 13B, the ferrule holding member 117 on which the protective member 123 is hooked is inserted into the housing 113 through the rear opening 131 and attached to the housing 113. Thus, the assembling of the optical connector 111 is completed.

As seen from the above description, in the optical connector 111, as in the optical connector 11 according to the first embodiment, in fiber termination work it is not necessary to insert the optical fiber 27 into the spring member 119 or the ferrule holding member 117 in advance, whereby the termination workability is increased. Since the spring member 119 is fixed to the ferrule holding member 117 so as to cover the fiber insertion grooves 147, the optical fiber 27 can be prevented from coming off when it is inserted into the housing 113. Furthermore, since the ferrule holding member 117 holds the ferrule 15 in a state that the annular portion 45 of the ferrule 15 is sandwiched between the support portion 143 and the spring member 119 and is kept in elastic contact with the U-shaped support portion 144 of the support portion 143 by the spring member 119, the insertion-into-housing work is facilitated.

As described above, the assembling methods of the optical connectors 11 and 111 according to the first and second embodiments enable cost reduction through increase in workability and assembling efficiency.

The optical connector and the assembling method of an optical connector according to the invention are not limited those according to the first and second embodiments, and modifications, improvements, etc. can be made as appropriate. And the material, shape, dimensions, number, location, etc. of each constituent element (or each set of constituent elements) are arbitrary and are not restricted as long as the invention can be implemented.

For example, although each embodiment employs the crimping ring 21 which is shaped like an elliptical cylinder as a crimping member for fixing outer sheaths 39 (an outer sheath 139), placed on the outer circumferential surface 61 (161) of the crimped portion 35 (135) of the ferrule holding member 17 (117), of the optical fiber cable 25 (125), the invention is not limited to such a case. Instead, a crimping plate that is approximately shaped like an elliptical cylinder may be used. That is, an approximately elliptical-cylinder-shaped crimping plate that has been formed by bending a rectangular metal plate has a slit that extends parallel with the axial line of the optical fiber cable 25 (125) fixes outer sheaths 39 (an outer sheath 139) of the optical fiber cable 25 (125) to the crimped portion 35 when crimped.

Although the invention has been illustrated and described for the particular preferred embodiments, it is apparent to a person skilled in the art that various changes and modifications can be made on the basis of the teachings of the invention. It is apparent that such changes and modifications are within the spirit, scope, and intention of the invention as defined by the appended claims.

The present application is based on Japanese Patent Application No. 2012-178654 filed on Aug. 10, 2012 and Japanese Patent Application No. 2012-277095 filed on Dec. 19, 2012, the contents of which are incorporated herein by reference.

What is claimed is:

1. An optical connector comprising:
 a ferrule that is connected to a tip portion of an optical fiber cable;
 a housing that contains the ferrule;
 a ferrule holding member that is attached in the housing and positions and holds the ferrule and an optical fiber in the housing; and
 a spring member that urges the ferrule toward a tip side of the housing,
 wherein the ferrule holding member includes:
  a support portion which is provided at a tip portion of the ferrule holding member and restricts movement of the ferrule toward the tip side of the housing;
  a fiber insertion groove which is formed on a side surface of the ferrule holding member for containing the optical fiber;
  a crimped portion which is provided on a rear portion of the ferrule holding member from which the optical fiber leads out, and wherein a crimping member is attached to an outer circumferential surface of the crimped portion for fixing at least one of a high-tensile-strength wire and an outer sheath of the optical fiber cable; and
  a spring fixing portion to which the spring member is fixed, the spring member being attached to the ferrule holding member so as to keep the ferrule in elastic contact with the support portion and to cover the fiber insertion groove.

2. The optical connector according to claim 1, wherein the support portion has a U-shaped support portion which extends along an outer circumferential surface of the ferrule and a link support portion which links the U-shaped support portion to the tip portion of the ferrule holing member; and
 wherein an annular portion is protrudingly formed on the outer circumferential surface of the ferrule and is retained by the U-shaped support portion so that movement of the ferrule toward the tip side of the housing is restricted.

3. The optical connector according to claim 1, further comprising:
 a protective member that has a protective portion and a flange portion,
 wherein the protective portion covers an outer circumferential surface of the optical fiber cable and the crimping member;
 wherein the flange portion is continuous with the protective portion and closes a rear opening of the housing; and
 wherein a T-shape projection projects from the flange portion toward the housing, a neck portion of the T-shape projection is inserted in a cut out portion formed on an outer side portion of the ferrule holding member, and an open end of the cut out portion is closed by an inner surface of a side wall of the housing.

4. A method of assembling an optical connector, comprising:
 inserting a tip portion of an optical fiber cable into a crimping member;
 fixing a ferrule to an exposed tip portion, exposed by removing an outer sheath from the tip portion of the optical fiber cable, of an optical fiber;

placing the ferrule on a support portion of a ferrule holding member while inserting the tip portion of the optical fiber into a fiber insertion groove which is formed in the ferrule holding member;

urging the ferrule forward in an axial direction of the ferrule by a spring member which is attached to the ferrule holding member so as to cover the fiber insertion groove;

fixing at least one of a high-tensile-strength wire and the outer sheath of the tip portion of the optical fiber cable to a crimped portion provided on a rear end portion of the ferrule holding member from which the optical fiber leads out by using the crimping member; and inserting the ferrule holding member which holds the ferrule into a housing and attaching the ferrule holding member to the housing.

* * * * *